United States Patent [19]
Malmquist

[11] Patent Number: 5,436,328
[45] Date of Patent: Jul. 25, 1995

[54] EXTRACTION SYSTEM

[76] Inventor: Mats Malmquist, Hurtigs gata 63, S-754 39, Uppsala, Sweden

[21] Appl. No.: 117,051
[22] PCT Filed: Mar. 11, 1992
[86] PCT No.: PCT/SE92/00151
   § 371 Date: Nov. 29, 1993
   § 102(e) Date: Nov. 29, 1993
[87] PCT Pub. No.: WO92/15597
   PCT Pub. Date: Sep. 17, 1992

[30] Foreign Application Priority Data
Mar. 11, 1991 [SE] Sweden .................. 9100725

[51] Int. Cl.⁶ .............. C07H 21/00; B01L 11/00
[52] U.S. Cl. ................ 536/25.42; 536/25.41; 422/101; 435/6; 435/287; 435/810
[58] Field of Search ........... 536/25.4, 25.41, 25.42; 422/72, 99, 100, 101, 102, 104; 435/6, 287, 291, 296, 312, 311, 803, 809, 810; 436/63, 161, 165, 177, 807, 808, 810

[56] References Cited
U.S. PATENT DOCUMENTS 3,432,487  3/1969  Levin .
3,983,037  9/1976  Lee et al. ................... 422/72
4,786,471  11/1988 Jones et al. ................ 422/102
4,824,560  4/1989  Alspector .................. 422/102
4,956,298  9/1990  Diekmann ................. 422/102
4,997,932  3/1991  Reardon et al. ............ 435/6

FOREIGN PATENT DOCUMENTS
0338591  4/1989  European Pat. Off. .

Primary Examiner—William H. Beisner
Attorney, Agent, or Firm—Browdy and Neimark

[57] ABSTRACT

The present invention relates to an extraction device and a method of using such an extraction device. The extraction device, includes exchangeable reaction vials (2A, 2B, 2C) and a housing (3) having at least one longitudinally arranged capillary (12) therein. A reaction vial (2A, 2B, or 2C) and housing (3) being constructed to engage and form a closed system communicating the capillary (12) with the interior of a reaction vial (2A, 2B, or 2C). The method of using the closed extraction device involved denaturing a sample containing nucleic acid in a reaction vial followed by engaging the reaction vial to the housing and centrifuging the closed unit to allow a nucleic acid-binding medium to bind the nucleic acid. Exchangeable reaction vials (2A, 2B, 2C) containing a washing buffer and a medium causing dissociation of bound nucleic acid from the nucleic acid-binding medium are sequentially exchanged with the reaction vial engaged with the housing in order to wash the bound nucleic acid, or to dissociate the nucleic acid and bring it into solution.

21 Claims, 2 Drawing Sheets

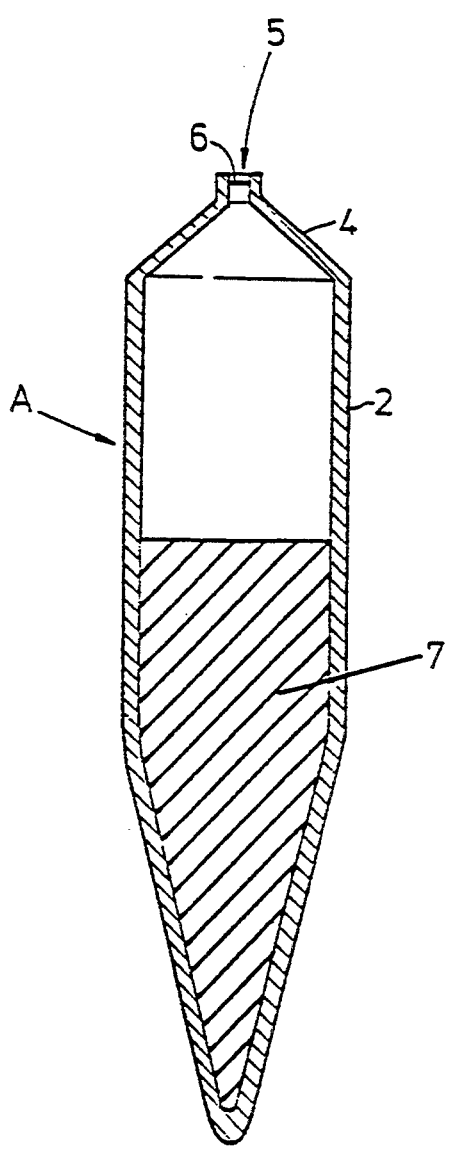
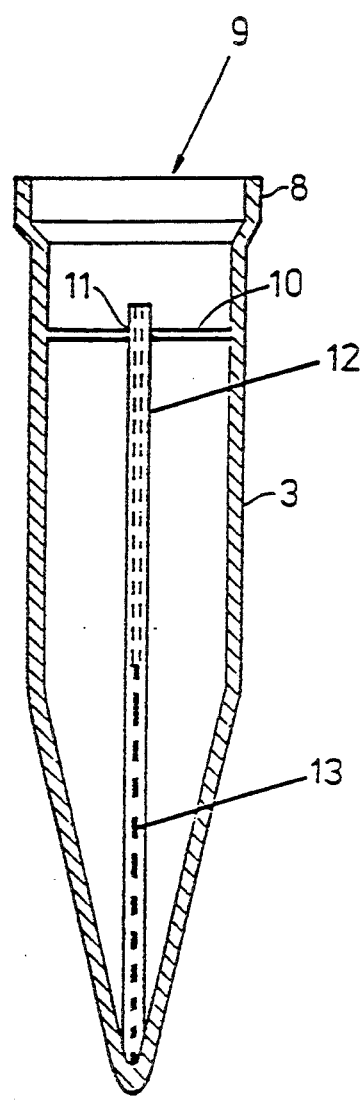
Fig. 1
Fig. 2

EXTRACTION SYSTEM

BACKGROUND OF THE INVENTION

1. Field of the Invention

The present invention concerns an extraction system, in particular the present invention concerns a method to perform extraction of nucleic acids in a closed system and an extraction system to pursue the method.

2. Description of the Related Art

Extractions of nucleic acids from cells are important procedures in biochemical work. Such extractions are normally accomplished by chemical or physical denaturation of membranes, followed either by precipitation of the nucleic acid, or by permitting nucleic acids to bind to a medium with affinity to nucleic acids. Subsequently the nucleic acid is washed or cleaned.

These operations are normally carried out using conventional procedures in an open handling chain, typically using piston pipers and microcentrifuge tubes. A disadvantage with this open handling is that the reaction liquid is repeatedly exposed, giving rise to contamination risks.

Such contamination consists predominantly of airborne particles carrying microorganisms, fragments of nucleic acids and nucleases. The present invention aims to minimize the risk for this type of contamination during extraction of nucleic acids by handling the components of the process (cells, chemicals and binding medium for nucleic acids) in a closed handling chain.

SUMMARY OF THE INVENTION

In brief, the principle for the present invention is to utilize a medium (a chemical compound or a suspension of particles) which is denser than water and has an affinity to specific molecules, e.g. nucleic acids, which is serving as a shuttle, that, using centrifugation or sedimentation, alternately is transferred to desired fluid matter (e.g. washing buffer), alternately is temporarily stored in a capillary tube, at time for exchange of the desired fluid matter.

BRIEF DESCRIPTION OF THE DRAWINGS

The invention will now be more precisely described in relation to the enclosed figures, in which FIG. 1 is a section view of a first reaction vial constituting one of the two parts of an extraction system according to the present invention;

FIG. 2 is a section view of a second reaction vial, constituting the second part of the extraction system according to the present invention.

DESCRIPTION OF THE PREFERRED EMBODIMENT

Figure 3:
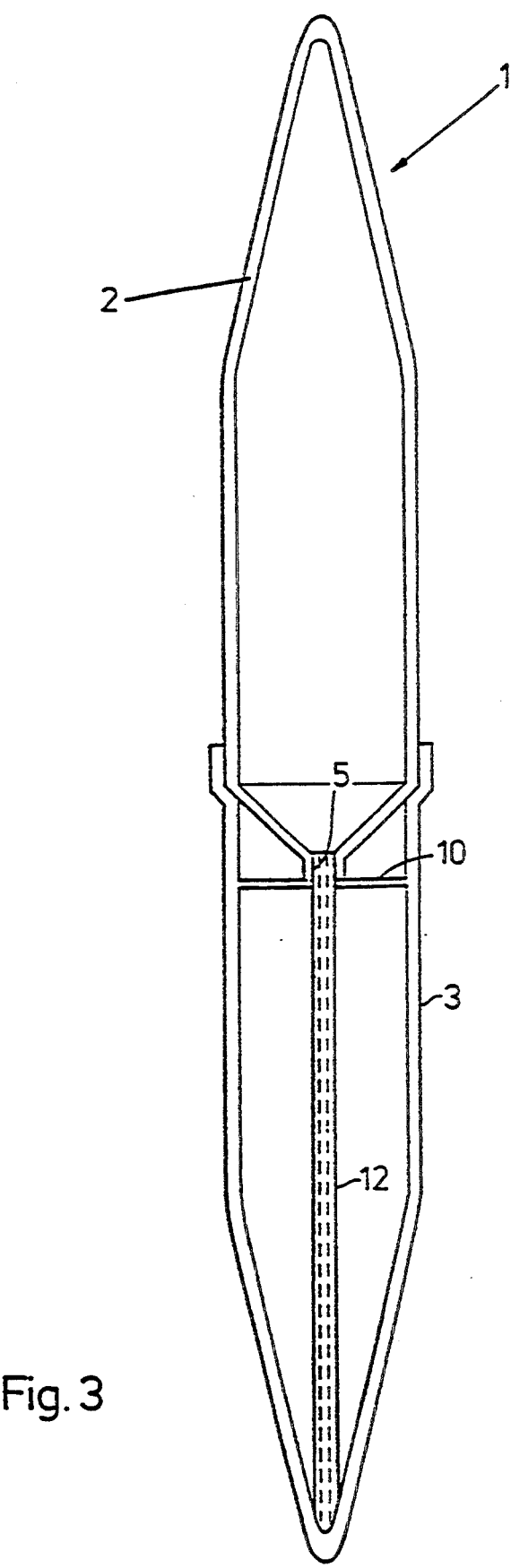
FIG. 3. is a diagrammatic view of the extraction system mounted together.

The extraction system according to the present invention is generally designated by reference number 1 in the figures. The extraction system includes a first reaction vial 2 according to FIG. 1 and a second reaction vial 3 according to FIG. 2, both having configurations permitting them to be fitted together with the bottom ends directed upwards and downwards respectively as illustrated in FIG. 3. This fit is generated by means of the reaction vial 2 being provided with an upper, convergent section or lid 4 and the reaction vial 3 being provided with an upper divergent or collared section 8. The angle(s) of the convergent section corresponds to the divergent section leading to a tight fit and, consequently, a closed system when the two reaction vials 2, 3 are mounted together as shown in FIG. 3. Also as shown in FIG. 3, the outer diameter of the first reaction vial 2 corresponds to the inner diameter of the collared section 8 of the section reaction vial 3.

In lid 4 of the first reaction vial 2, one or more (the number corresponds to the number of capillaries 12 below) tube shaped orifices 3 which optionally can be covered by a permeable membrane 6, is provided. The second reaction vial 3 is provided with a considerably wider orifice 9 in comparison to orifice(s) 5, which orifice 9 serves to exchange the upper section 4 of the reaction vial 2 as explained above, c.f. FIG. 3.

The second vial 3 is a housing in which, one or more capillaries 12 are longitudinally arranged. These capillaries 12 are fixed, preferably the center of the second reaction vial 3, as a consequence of the top end(s) being inserted into a bore 11 in a horizontal disc 10, which is situated in the upper section of the reaction vial 3 precisely beneath collared section 8, and with the lower end(s) being firmly attached to the bottom of reaction vial 3.

As shown in FIG. 3, tube shaped orifices 5 are dimensioned precisely to fit over the upper section of capillaries 12 and to establish contact with disc 10.

Below is described a preferred way to use the extraction system according to the invention, for extraction of nucleic acids.

The capillaries 12 are provided with a medium having affinity to nucleic acids 13 (referred to below as DNA-binder), which has a higher density than water. The second reaction vial 3, which encloses capillaries 12, has the shape of a microcentrifuge tube, and has three functions. One function is to keep its contents isolated from the environment, which reduces the risk of contamination, risk of infection such as the in case of extracting infectious matter. Another function is to stabilize the capillaries during centrifugation, and a third function is to serve as a stop collar during centrifugation. Capillary stability is achieved in bore 11 of horizontal disc 10 as described above. The stop collar function is achieved with the upper collared section 8 of the second reaction vial 3, leading to an upside down first reaction vial 2 being brought into contact and engagement with the diverging walls of the collar, according to the description above.

To a reaction vial 2, here being denoted reaction vial 2A, a membrane denaturating medium 7 (e.g. concentrated saline solution, lysozyme and/or alkali is provided), followed by bore 5 in lid 4 sealed with a thin membrane 6. To another reaction vial 2 (not shown), here being denoted reaction vial 2B a washing, buffer (a saline solution for using the DNA-binder is added, thereby cleaning it from coagulated proteins, cell-fragments and other impurities without eluating the DNA from DNA-binder). To yet another, reaction vial 2 (not shown), here being denoted reaction vial 2C, distillated water, is added after which reaction vials 2B and 2C are also sealed with thin membranes. The operations described above may be carried out in advance commercially.

The manual handling procedure is initiated by the addition of sample, e.g. blood to reaction vial 2A, using a syringe, piper or a measuring capillary Reaction vial 2A is incubated and the contents may be boiled in order to denaturate nucleases. Capillaries 12 of second reaction vial 3 are then engaged to reaction vial 2A by bringing the tube shaped orifices 5 over the capillaries 12 until their verges are brought into contact with the disc 10. Reaction vial 2A engaged to reaction vial 3 forms a closed unit (c.f FIG. 3), which is then placed with the bottom of the reaction vial 2A directed downwards/outwards in a microcentrifuge, followed by a short centrifugation, which transfers the contents of each capillary (i.e. DNA-binder) into reaction vial 2A. After powerful mixing, e.g by vortexing, of the contents of reaction vial 2A, the DNA from the sample will bind to the DNA-binder.

Subsequently, the closed extraction system 1 is turned and placed with the bottom of the reaction vial 3 downwards, either in a stand for tubes, allowing the DNA-binder 13 with bound DNA to sediment back into the capillaries 12, or in a microcentrifuge with the bottom of the reaction vial 3 directed downwards/outwards, followed by a short centrifugation in which the DNA-binder 13 with bound DNA is returned to the capillaries 12.

Reaction vial 2A and its contents are discarded, and reaction vial 2B containing a washing buffer is engaged to reaction vial 3 and on the capillaries 12 as described above. The DNA-binder with bound DNA is transferring by centrifucation into reaction vial 2B containing a washing buffer. The content of the reaction vial 2B is mixed, e.g. by vortexing, to achieve effective rinsing/cleaning of bound DNA. Subsequently the DNA-binder with bound DNA is tranferred back to the capillaries 12 by sedimentation or centrifugation according to the same procedure as described above concerning reaction vial 2A. Afterwards reaction vial 2B and its contents are discarded.

If further rinsing is desired, the procedure is repeated one or several times from the point of replacement of reaction vial 2A to the point of discarging reaction vial 2B and its contents.

If no further rinsing is desired reaction vial 2B is replaced with reaction vial 2C containing water or other medium for bringing DNA into solution. The DNA-binder with bound DNA is centrifuged down into the reaction vial 2C, which is shaken, in which the DNA will dissociate from the DNA-binder and be brought in solution in the water. The bound DNA-binder without DNA may be sedimented or be pelleted by centrifugation, optionally to the bottom of reaction vial 2C or back into the capillaries 12, where afterwards reaction vial 2C engaged to reaction vial 3 are discarded together.

The DNA now being in solution in the reaction vial 2C, would, due to the closed handling described above, ensure very reliable results in e.g. PCR.

Preferrably, the DNA in reaction vial 2C is dispensed using a dispenser according to the SE application 91-00726-0, to which is referred.

What is claimed is:

1. A method of extracting nucleic acid in a closed system, comprising the steps of:
   a) adding a sample containing nucleic acid to a first reaction vial (2A) containing a membrane denaturing medium (7), and incubating;
   b) securably engaging an orifice (5) situated in an upper lid (4) of said first reaction vial with an upper portion of at least one capillary tube (12) disposed in a housing (3) having a bottom, said at least one capillary tube (12) containing a nucleic acid-binding medium (13) denser than water and being secured to the bottom of said housing (3), said first reaction vial (2A) having a bottom forming a closed unit (1) with said housing (3) wherein said at least one capillary tube (12) communicates with said first reaction vial to form an open passage;
   c) centrifuging said closed unit (1) with the bottom of said first reaction vial (2A) directing downwards and the bottom of said housing (3) directing upwards, to transfer said nucleic acid binding medium (13) from said at least one capillary tube (12) to said first reaction vial (2A);
   d) binding said nucleic acid of said sample to said nucleic acid binding medium (13) in said first reaction vial (2A) with mixing;
   e) centrifuging said closed unit (1) with the bottom of said housing (3) directing downwards and the bottom of said first reaction vial (2A) directing upwards to transfer said nucleic acid-binding medium (13) with bound nucleic acid from said first reaction vial (2A) to said at least one capillary tube (12);
   f) replacing said first reaction vial (2A) in said closed unit (1) with a second reaction vial (2B) containing a washing buffer;
   g) repeating steps c) and e) to wash said bound nucleic acid with mixing there between;
   h) replacing said second reaction vial (2B) in said closed unit (1) with a third reaction vial (2C) containing a nucleic acid dissociation medium;
   i) repeating step c) to dissociate said bound nucleic acid from said nucleic acid-binding medium (13), said nucleic acid dissociation medium bringing said dissociated nucleic acid into solution; and
   j) disconnecting said third reaction vial (2C) from said housing (3) to remove said nucleic acid as a solution for further analysis.

2. A method according to claim 1, wherein said nucleic acid-binding medium dissociated from said nucleic acid in step i) is allowed to settle to the bottom of said third reaction vial (2C).

3. A method according to claim 1, wherein step g) for washing said bound nucleic acid is repeated with at least one said second reaction vial (2B) containing a washing buffer before step h).

4. A method according to claim 1, wherein said nucleic acid binding medium dissociated from said nucleic acid in step i) is centrifuged into said third reaction vial (2C).

5. A method according to claim 1, further comprising centrifuging said nucleic acid binding medium dissociated from said nucleic acid in step i) into said at least one capillary tube (12).

6. A method according to claim 1, further comprising the step of boiling before step b) to denaturate nucleases.

7. A method according to claim 6, wherein step g) for washing said bound nucleic acid is repeated with at least one said second reaction vial (2B) containing a washing buffer before step h).

8. A method according to claim 7, wherein said nucleic acid binding medium dissociated from said nucleic acid in step i) is centrifuged into said third reaction vial (2C).

9. A method according to claim 7, further comprising centrifuging said nucleic acid binding medium dissociated from said nucleic acid in step i) into said at least one capillary tube (12).

10. A method according to claim 6, wherein said nucleic acid-binding medium dissociated from said nucleic acid in step i) is allowed to settle to the bottom of said third reaction vial (2C).

11. A device for separating a first substance by chemical binding away from a mixture containing at least one other substance, comprising:
   at least one vial having an upper and lower portion and being capable of holding said mixture;
   a housing having an upper portion and lower portion;
   at least one capillary tube having a closed lower end and an open upper end for holding a binding medium for said first substance, said at least one capillary tube being fixedly disposed in said housing and extending substantially along a longitudinal axis of said housing; and
   means for connecting one of said at least one vial and said housing to form a closed unit, said at least one capillary tube communicating with said vial in said closed unit.

12. A device according to claim 11, wherein:
   said means for connecting one of said at one vial and said housing is a converging lid disposed in said upper portion of said at least one vial and a corresponding diverging collar disposed in said upper portion of said housing, said at least one vial and said housing being capable of interfitting together, said lid being provided with at least one tubular orifice.

13. A device according to claim 12 wherein said at least one tubular orifice is covered by a permeable membrane.

14. A device according to claim 12, wherein said at least one capillary tube is a single capillary tube and said at least one tubular orifice is a single tubular orifice, said tubular orifice being centered in said converging lid and said capillary tube being correspondingly centered in said housing.

15. A device according to claim 14, wherein:
   said open upper end of said capillary tube is secured in a bore of a disc disposed in said upper portion of said housing beneath said diverging collar; and
   said closed lower end of said capillary tube is fixedly disposed to said lower portion of said housing.

16. A device according to claim 4, wherein:
   said at least one capillary contains a nucleic acid binding medium; and
   said at least one vial is a first vial, a second vial and a third vial, wherein said first vial contains a membrane denaturing medium, said second vial contains a washing buffer, said third vial contains a medium capable of dissociating a bound nucleic acid from said nucleic acid-binding medium.

17. A closed extraction system, comprising:
   a first reaction vial (2A) having an interior containing a membrane denaturing medium;
   a second reaction vial (2B) exchangeable for said first reaction vial and having an interior containing a washing buffer;
   a third reaction vial (2C) exchangeable for said second reaction vial and having an interior containing a medium for dissociating bound nucleic acid from nucleic acid-binding medium;
   a housing (3) having at least one capillary tube (12) disposed longitudinally in said housing, said at least one capillary tube having an upper and lower end and containing a nucleic acid-binding medium, each of said first, second and third reaction vials (2A, 2B, 2C) capable of engaging with said housing (3) to form a closed system, said closed system having an open passage formed by communicating said at least one capillary tube (12) with the interior of one of said first, second and third reaction vials (2A, 2B, 2C).

18. A closed extraction system according to claim 17, wherein:
   said housing (3) has an upper diverging collared portion (8); and
   each of said first, second and third reaction vials (2A, 2B, 2C) has an upper converging lid (4) adapted to engage said upper diverging collared portion (8) of said housing (3), said lid having at least one tubular orifice (5) disposed therein, the inner diameter of said at least one tubular orifice (5) being adapted for engagement to the outer diameter of said at least one capillary tube (12).

19. A closed extraction system according to claim 18, wherein said at least one tubular orifice (5) is covered by a permeable membrane.

20. A closed extraction system according to claim 18, wherein:
   said at least one capillary tube (12) is centrally disposed in said housing (3); and
   said at least one tubular orifice (5) is correspondingly centrally disposed in said upper converging lid (4).

21. A closed extraction system according to claim 20, wherein:
   the upper end of said at least one capillary tube (12) is arranged in a bore (11) of a disc (10) disposed in said housing (3) below said upper diverging collared portion (8); and
   the lower end of said at least one capillary tube (12) is fixedly arranged at the bottom of said housing (3).

* * * * *